Feb. 2, 1960 — D. C. CLINE — 2,923,305
SEALING CLOSURE
Filed Aug. 7, 1957 — 2 Sheets-Sheet 1
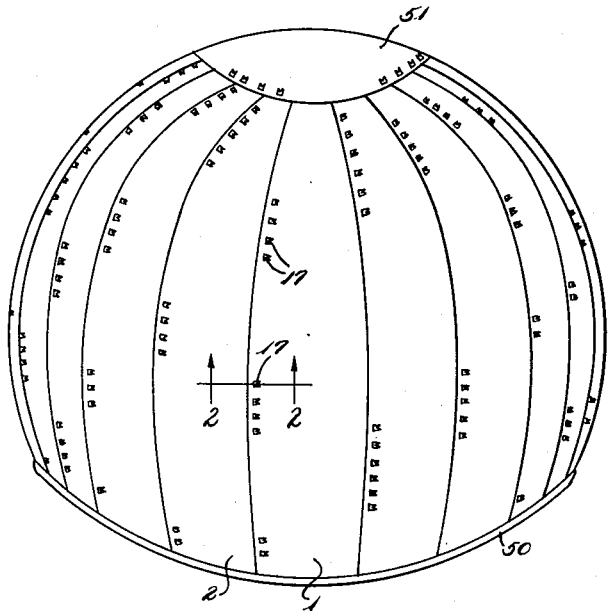
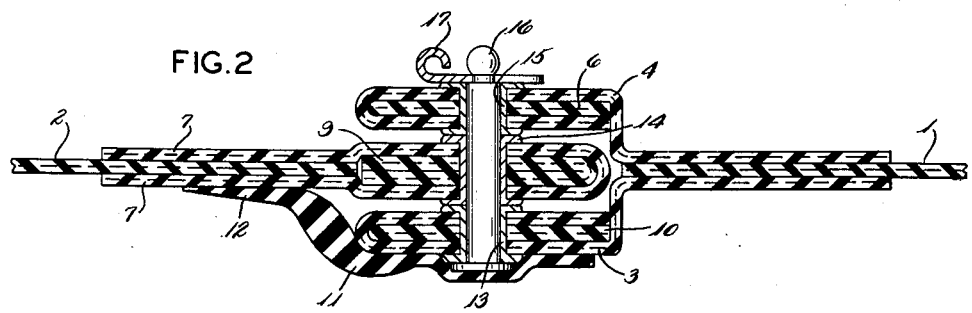
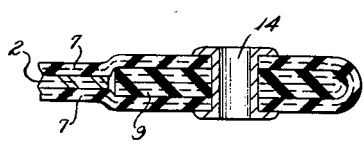
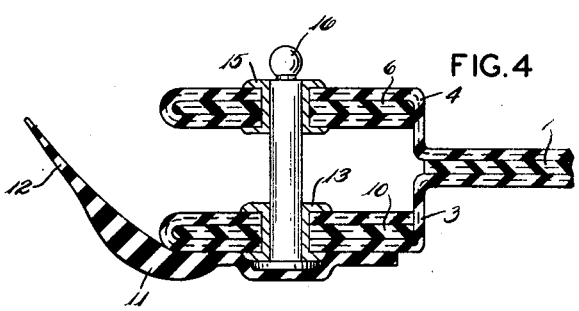
INVENTOR.
DELBERT C. CLINE
BY W. A. Fraser
ATTY.

Feb. 2, 1960     D. C. CLINE     2,923,305
SEALING CLOSURE

Filed Aug. 7, 1957     2 Sheets-Sheet 2

*INVENTOR.*
DELBERT C. CLINE
BY
*W. A. Fraser*
ATTY.

United States Patent Office 2,923,305
Patented Feb. 2, 1960

2,923,305

SEALING CLOSURE

Delbert C. Cline, Silver Lake, Ohio, assignor to The Firestone Tire & Rubber Company, Akron, Ohio, a corporation of Ohio Application August 7, 1957, Serial No. 676,884

3 Claims. (Cl. 135—15)

This patent relates to improved portable structures and means for joining the edges of sheet material to form such structures. More particularly this patent relates to a device for fastening the edges of flexible sheets and in one modification to fastening edges of such sheets to form a pneumatically impenetrable seam.

In the use of portable shelters it is convenient to carry the structure in sections to the location of erection and there assemble the shelter. For example, a truck may be employed to carry a number of flexible sections of a shelter structure to the location of erection and the sections may be secured together by means of a zipper, button, or otherwise to form a structure which may be inflated with air or otherwise supported to house personnel or equipment. Because certain equipment is adversely affected by the presence of metal units in the wall of enclosing structures, the structures of the invention are preferably but not neecssarily made of materials which are non-metallic. Although zippers and buttons have been used for assembling portions of such structures, these fasteners have not been satisfactory for various reasons.

The present invention overcomes the difficulties of the prior art by providing flexible sheets having edge portions which fit together and interlock in a novel arrangement and which in one form of the invention are sealed against the escape of air supporting the structure.

It is therefore an object of the invention to provide an improved portable structure.

It is another object of this invention to provide means for holding together flexible structural components. It is also an object of this invention to provide means for joining the edges of panels of rubberized fabric. A further object of this invention is to provide fasteners for holding together the edges of rubberized fabric panels or sheets assembled to form a structure. Yet another object of the invention is to provide a fastener for joining rubberized fabric sections together in a manner designed to prevent the escape of air under pressure used to support the structure.

These and other objects of the invention will be more readily understood by reference to the specifications, claims and drawings, of which:

Figure 1 is a perspective view of a structure of the invention.

Figure 2 is an enlarged fragmentary sectional view taken along line 2—2 of Fig. 1.

Figure 3 is an enlarged fragmentary sectional view of the inserting edge of a rubberized fabric panel of the invention.

Figure 4 is an enlarged fragmentary sectional view of a receiving edge of the fastener of the invention.

Figure 5:
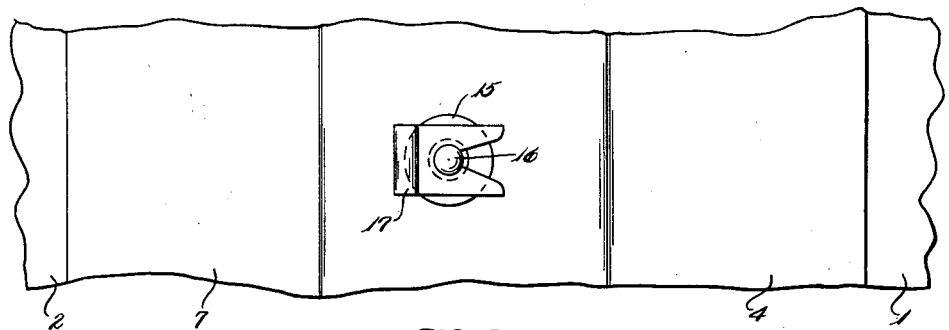
Figure 5 is a fragmentary plan view of two joined edges of rubberized fabric employing the invention.

The preferred form of the invention contemplates that the flexible panels are of vulcanized rubberized fabric and it is this form which is described by way of example.

Referring to the figures of the drawing, the respective sheets of rubberized fabric 1 and 2 terminate at respective edges in receiving and insertion portions. Rubberized fabric sheet 1, Fig. 2, terminates at one edge in a receiving portion formed by molded rubberized fabric sheets 3 and 4, which are turned back on themselves around rubberized fabric sheets 6 and 10, respectively, to form when vulcanized, two flaps between which fit the insert portion of fabric sheet 2. Sheet 2 merges and terminates at an edge in an insert portion comprised of rubberized fabric strip 7 lapped around the edge of sheet 2, in the center of which is folded rubberized fabric strip 9. To provide for holding the insert portion of sheet 2 between the flaps on the edge of sheet 1, plastic or metal grommets 13, 14 and 15 are inserted in aligned holes in the respective edges of the insert and receiving portions. Through the holes in the grommets protrudes pin 16, which is provided on its outer end with a knob-like portion around the neck of which is secured clip 17. To prevent the escape of air from the inside of a penumatically supported closed structure when such is formed by the assembly of fabric sheets such as 1 and 2, a molded vulcanized rubber flap 11 is adhered by cementing or vulcanization to the inner flap of sheet 1. Flap 11 has portion 12 protruding outwardly from the inner flap sheet 1 to abut against the surface of sheet 2 as on strip 7. It will be seen that when air under pressure of, for example, ¼ pound per square inch gauge pressure is within the pneumatically supported structure, flap 11 and particularly portion 12 is pressed against the inner surface of sheet 2 to prevent escape of air.

It will be seen that by making the flaps of sheet 1 and the insert portion of sheet 2 continuous along the edges of each respective sheet and by spacing grommets at intervals along the edges of each sheet an airtight seam between the edges of the fabric portions may be made.

Figure 6:
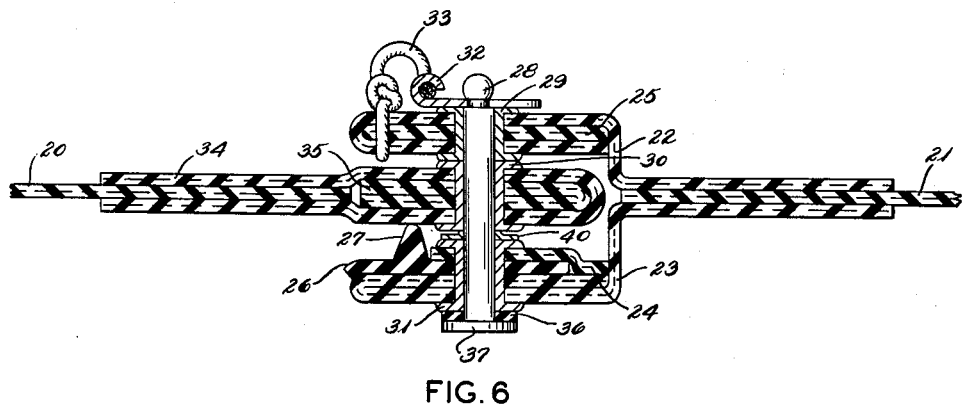
Figure 6 is a sectional view of a modification of the invention.

Referring to Fig. 6, a modification of the invention is shown wherein rubberized fabric sheet 21 is attached to rubberized fabric sheet 20 by the assembly of the insert and receiving portions comprised of lapped fabric 22, 23, 24, and 25 as in the preferred form of the invention. Fabric sheet 20 merges at its edges into and is vulcanized to rubberized fabric portion 34, which is lapped on itself to encompass the edge of sheet 20, together with folded rubberized fabric portion 35. Grommets 29, 30 and 31 pierce the respective insert and flap members in aligned relation and are adapted to receive pin 28. Pin 28 is permanently anchored in the inner flap by lock nut 40 and base 37. This pin is provided with a head and a neck portion which receives snap fastener 32 which is tied to the sheet by wire portion 33 to prevent loss. To seal the edges of the two sheets of rubberized fabric against the escape of air within the pneumatic structure a shaped member 26 formed for example by the extrusion of rubber or plastic through a die, is placed between the inner flap and the insert portion of sheet 20. Shaped member 26 includes an outwardly protruding rib-like portion 27 which abuts the inner surface of insert portion of sheet 20 to prevent the escape of air. To prevent air from seeping around the pin 28, a rubber or plastic washer 36 is mounted on pin base 37 and adapted to lie in compression against grommet 31 when speed nut 40 is pushed into place.

In assembling of the device of the invention the two separate sheets 1 and 2, shown in Fig. 2 are laid edge to edge with insert portion of sheet 2 reposing in contiguous relation between the flaps of the edge of sheet 1. Since these sheets are provided on one edge with a continuous insert portion (Fig. 4) and along the other edge with an insert portion (Fig. 3) a number of panels or sheets may be joined to form the continuous wall of a structure of a shelter such as shown in Fig. 1. To join the sheets by the insert and flap portions, the grommets such as 13, 14 and 15 are aligned to receive pins, such as 16. The pins are anchored permanently in the flaps and inserted through the grommets to secure the respective insert portions to the flaps and are locked with clips such as 17. When arranged to form a pneumatically supported shelter such as shown in Fig. 1 the edge portions are made pneumatically impenetrable by continuous strip 11 along the common edge for the entire length thereof, strip 11 is a molded member of hooked section such that the end 12 curves around and past the plane of sheet 1 (Fig. 4). This configuration results in member 11 being under compression when the edges are assembled (Fig. 2). The rubber strips 11 are compressed by the deformation and inflation pressure in the structure to seal the common edge of the sheets against air loss. The entire structure may be assembled by lining up the respective strips with their insert and flap edges joined, securing the ends of the strips to a base ring 50, Fig. 1, and the tops of the strips by means of the fastener of the invention to a rubberized fabric center portion 51. To complete the structure an adequate door, not shown, may be provided.

The structure shown in Fig. 1 may be used for housing delicate instruments and other equipment or for housing personnel.

Although the present invention has been described in relation to a pneumatically supported shelter the fastener device of the invention may be used to join flexible panels supported by other means such as by interior strain members such as beams and the like. The invention is also useful for joining small panels, sheets of plastic or fabrics of other flexible material to form larger sheets which are useful for many purposes.

Although various modifications of the invention have been shown by way of example those skilled in the art will recognize that the invention is not limited thereto but only by the bounds of the following claims:

What is claimed is:

1. A flexible closure for sealing separable margins of sheets forming a fluid pressure container, said sheets arranged with one edge of each sheet joined to the contiguous edge of each adjacent sheet, two flaps protruding from said one edge of said sheet to incompress the contiguous edge of adjacent sheet to form a seam, means on said sheets for anchoring the edges of the sheets at said seam against relative movement and a rib of rubber-like material interposed between the inner-most flap and the inner surface of each sheet adjacent the contiguous edge for sealing said seam against passage of fluid therethrough, said rib under compression and bearing against both sheets when the sheets are joined.

2. A flexible closure for sealing separable margins of sheets forming a fluid pressure container, said sheets arranged with one edge of each sheet joined to the contiguous edge of each adjacent sheet, two flaps protruding from said one edge of said sheet to incompress the contiguous edge of adjacent sheet to form a seam, means on said sheets for anchoring the edges of the sheets at said seam against relative movement and a rib of rubber-like material anchored to the innermost flap and positioned between the innermost flap and the inner surface of each sheet adjacent the contiguous edge for sealing said seam against passage of fluid therethrough, said rib under compression and bearing against both sheets when the sheets are joined.

3. A flexible closure for sealing separable margins of sheets forming a fluid pressure container, said sheets arranged with one edge of each sheet joined to the contiguous edge of each adjacent sheet, means protruding from said one edge of said sheet to incompress the contiguous edge of the adjacent sheet to form a seal, means for anchoring the sheets at said seams against relative movement with respect to each other and a molded flap rubber-like material anchored to the inner surface of one edge of each sheet coextensive therewith and having its protruding edge compressed against the inner surface of the adjacent sheet for sealing said sheet against passage of fluid therethrough when the sheets are joined.

References Cited in the file of this patent

UNITED STATES PATENTS

| | | |
|---|---|---|
| 1,871,570 | Weber | Aug. 16, 1932 |
| 2,422,249 | Malluk | June 17, 1947 |
| 2,493,749 | Brown et al. | Jan. 10, 1950 |
| 2,545,817 | Krupp | Mar. 20, 1951 |
| 2,629,875 | Geissmann | Mar. 3, 1953 |
| 2,649,101 | Suits | Aug. 18, 1953 |
| 2,731,055 | Smith | Jan. 17, 1956 |